Figure 1:
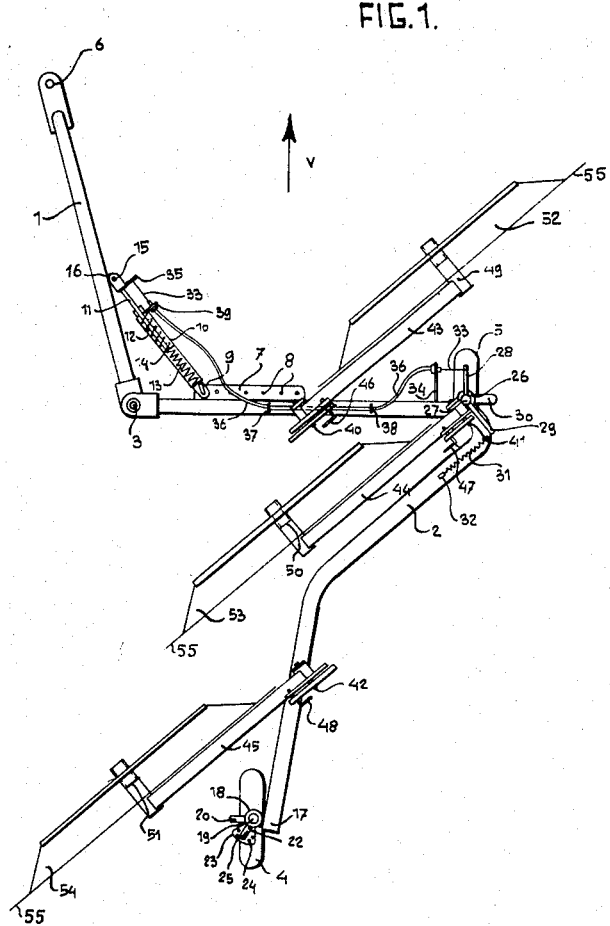

Oct. 11, 1960 C. VAN DER LELY ET AL 2,955,406
SIDE DELIVERY RAKE WITH DRAWBAR STEERING MEANS
Filed April 3, 1956 2 Sheets-Sheet 1

Oct. 11, 1960   C. VAN DER LELY ET AL   2,955,406
SIDE DELIVERY RAKE WITH DRAWBAR STEERING MEANS
Filed April 3, 1956   2 Sheets-Sheet 2
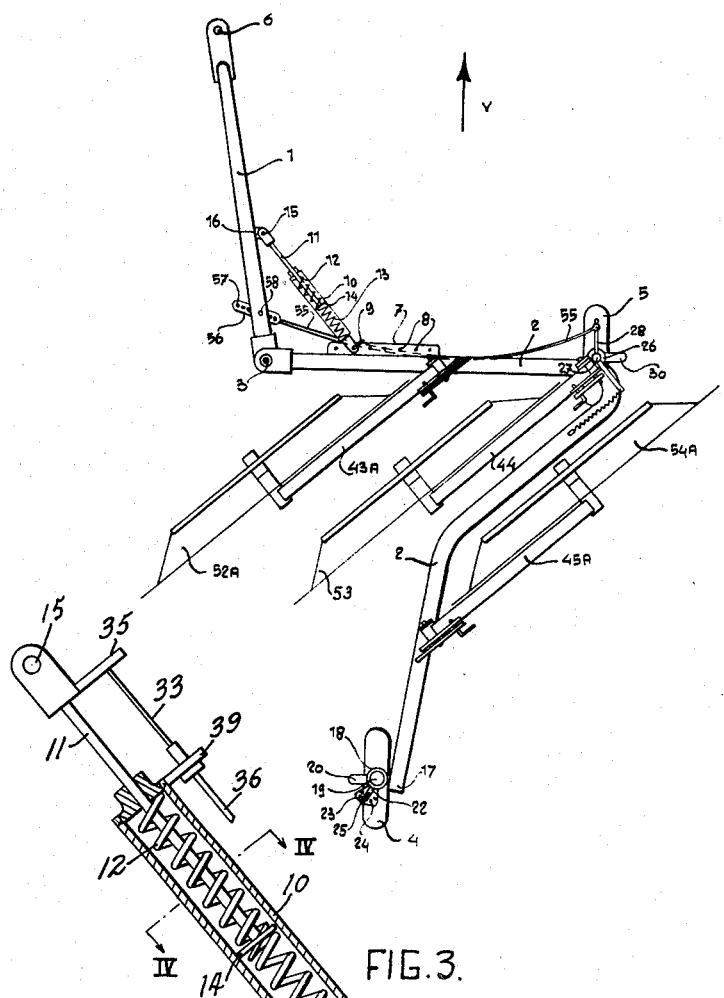
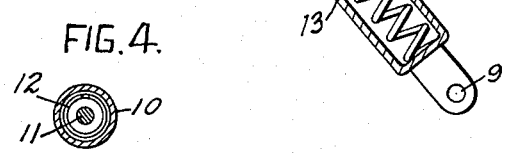

United States Patent Office 2,955,406
Patented Oct. 11, 1960

2,955,406

SIDE DELIVERY RAKE WITH DRAWBAR STEERING MEANS

Cornelis van der Lely and Ary van der Lely, Maasland, Netherlands, assignors to C. van der Lely N.V., Maasland, Netherlands, a Dutch limited-liability company Filed Apr. 3, 1956, Ser. No. 575,872

Claims priority, application Netherlands Apr. 6, 1955

5 Claims. (Cl. 56—377)

The invention relates to agricultural implements provided with frames supported by running wheels.

More particularly, the invention is concerned with implements of the type wherein a first running wheel is provided with an axle which, during operation, is rigidly arranged with regard to the frame, and with a second running wheel, the axle of which has a variable position and, during normal operation, is in not any position in a vertical plane comprising the axle of the first running wheel. This type of implement can, moreover, include a draw arm over which a force providing for the forward movement of the implement is exerted and which arm is rotatable about a substantially vertical axle with regard to the frame.

Implements of the above kind are already known. In one known implement of this kind, a first running wheel located toward the rear is secured, whereas a second running wheel situated closer to the front is arranged as a self-adjusting running wheel. This leads to skidding on turns and it would be desirable to prevent this skidding. Thus, it would be desirable if the second running wheel could simulate the first running wheel and transmit a lateral force to the ground. However, if the second running wheel were to be secured in position, the implement would nevertheless still skid.

It is an object of the present invention to provide a construction of the indicated type in which a second running wheel can transmit a lateral force to the ground and in which the implement can move through curves without skidding.

According to the invention, a draw arm is provided which is movable about a determinable position of equilibrium, whereas a movement transmitting device is provided which is coupled to the draw arm, the associated frame and the axle of the second running wheel and in which device the position of the draw arm with regard to the frame is referred to the position of the axle of the second running wheel with regard to the frame.

Further features and details of a preferred embodiment of the invention will be hereinafter more fully described with reference to the accompanying drawing in which:

Fig. 1 shows a top plan view of an agricultural implement according to an embodiment of the invention and arranged as a side delivery rake, Fig. 2 is a plan view of an implement arranged as a teddering device, Fig. 3 is an enlarged view of a detail of Fig. 1, and Fig. 4 is a section along line IV—IV of Fig. 3.

According to Fig. 1 and a first embodiment of the invention, there is provided a draw arm 1 which by means of a hinge having a vertical hinge axle 3 is pivotally connected to a mobile frame or horizontal frame beam 2 having angularly disposed sections and is supported by a first running wheel 4 and a second running wheel 5. The implement is pulled forward in direction V by the fore-part 6 of the draw arm 1, preferably by fastening said fore-part 6 to a tractor, the implement being further supported by said fore-part 6. In proximity to the axle 3, the front of the frame beam 2 carries an extension 7 provided with a row of apertures 8. By means of a pin 9 inserted through one of said apertures 8, an end of a tube 10 is hingedly connected to the frame beam 2. A bar or section 11 (see also Figs. 3 and 4) is slidingly arranged in the tube or section 10, springs or resilient means 12 and 13 tending to keep the bar 11 in a definite position with regard to the tube 10 by acting on a disc 14 mounted on one end of said bar 11. At portion 16, the free end of the bar 11 is connected to the arm 1 by means of a hinge having a vertical axle 15. The tube 10 and the bar 11 constitute together a resilient supporting bar tending continually to urge the arm 1 to a determinable position of equilibrium with regard to the frame beam 2. Said position of equilibrium can be modified, however, by fastening the pin 9 hingedly in one of the other apertures 8 of the extension 7.

The rear extremity 17 of the frame beam 2 supports a vertical tube 18 constituting a bearing for a vertical axle 19 which is connected to the axle of the running wheel 4 by means of a bar 20. The tube 18 carries a perforated horizontal projection 22 and the axle 19 carries a sector 23 in which a number of apertures 24 are defined. A locking pin 25 is inserted through the projection 22 and the sector 23 for keeping the wheel 4 in a desired position during operation.

The frame beam 2 carries a vertical tube 26 constituting a bearing for a vertical axle 27 which supports, above the tube 26, a forwardly extending arm 28 and an arm 29 extending obliquely to the rear. The lower end of the axle 27 is attached to the horizontal axle of the running wheel 5 by means of a bar 30. A draw-spring 31 connects the free end of the arm 29 to an eye 32 attached to the frame beam 2. The end of the arm 28 is connected to an end of a lip 35 fixed to the bar 11 by means of a Bowden cable or movement transmitting device 33 extending through an aperture in a lip 34 which is fixed on the frame beam 2. From the lip 34 the cable 33 is surrounded by a tube or second flexible means 36 which is incompressible in longitudinal direction and which is fixed to the frame beam 2 by means of flanges 37 and 38. One end of the tube 36 abuts lip 34 and the other end abuts a lip 39 attached to the tube 10. An element (not shown) which is expandible in longitudinal direction is incorporated into the tube 36 so that the total length of the tube between the lips 34 and 39 is adjustable.

The frame beam 2 carries three axles 40, 41 and 42 to which cranks 43, 44 and 45 are fixed for rotation on said axles. During operation, said cranks are secured, however, with respect to the frame by means of locking pins 46, 47 and 48. The cranks 43, 44 and 45 carry mutually parallel crank pins 49, 50 and 51 on which raking members 52, 53 and 54 are mounted so as to be freely rotatable. Said raking members are provided with circumferential tines 55 which come into contact with the ground or the crop during operation.

The use and the working of the implement described is as follows. The implement is attached by its fore-part 6 to a tractor which moves the implement forward in the direction V over the terrain on which the crop lies. The raking members 52, 53 and 54 rotate due to the contact of their tines with the ground or the crop and deliver the crop to the left. If desired, the running wheel 4 can be secured in a different position with regard to the frame beam 2, in which case the tube 10 is secured by means of the pin 9 in another aperture 8 in the extension 7 in order to bring the position of equilibrium of the arm 1 into line with the most favorable position of the fore-part 6.

If the running wheels 4 and 5 occupy the positions shown in Fig. 1, the line, along which the resultant of the forces exerted by the crop and the ground on the raking members 52–54 and along which the running wheels 4 and 5 act, coincides substantially with the longitudinal direction of the draw arm 1. When the tractor makes a turn to the left, the forepart 6 of the arm 1 is pulled to the left, during which action the spring 12 will be strained and the distance between the lips 35 and 39 will increase. In this case, the distance between the free end of the arm 28 and the lip 34 is reduced since the cable 33 cannot become longer. The spring 31 will thus continually strain the cable 33 due to which the cable is kept under constant pressure. Consequently, the arm 28 and the wheel 5 will begin to rotate in the same direction as the arm 1, so that the implement can follow the curve. The cable 33 thus constitutes a part of a movement transmitting device. A turn to the right can be made in a similar way.

The implement shown in Fig. 2 consists substantially of the same elements. Therefore, the same parts are designated by the same reference numerals as in Fig. 1. The differences are of two kinds, however. First of all, the cable 33 with the tube 36 and the supporting members 34, 35 and 39 for the cable are lacking and are replaced by a coupling bar 55, the right end of which is hingedly connected to the free end of the arm 28, the left end comprising an enlarged part 56 having a number of apertures 57. A pin 58 extending through the draw arm 1 as well as through one of the openings 57 effects a pivotal connection between the draw arm 1 and the coupling bar 55. If the pin 9 is put through a different aperture for displacing the tube 10 and for imparting another position of equilibrium to the draw arm 1, the pin 58 is generally inserted through another hole 57. The coupling bar 55 is curved so as to constitute no obstacle to a raking member mounted in front of the frame beam 2 in the manner of raking member 52 in Fig. 1.

The second difference with regard to the implement of Fig. 1 consists in that the cranks 43 and 45 with the raking members 52 and 54 are turned 180° (after the pins 46 and 48 are removed) about the axles 40 and 42 and these cranks are shown as cranks 43A and 45A with raking members 52A and 54A. In said position, the implement can be used as a teddering device.

It will be obvious that while making a turn the tractor which moves the draw arm 1 from its position of equilibrium shown in the drawing puts running wheel 5 into another position as a consequence of said draw arm 1 being coupled to the running wheel 5, the making of the turn without skidding being enabled in said other position.

If the running wheel 5 skids to the right in the implement according to Fig. 1 as well as in the one according to Fig. 2, the draw arm 1 will turn to the left, so that the running wheel 5 will also turn to the left. Said turning of the running wheel 5 is such that the implement is pushed to the left and thus will resume its original position.

What we claim is:

1. A device for laterally displacing material lying on the ground, comprising a frame, a plurality of raking elements on said frame, a first running wheel supporting said frame, an axle on said frame and coupled to said first running wheel, a second running wheel supporting said frame, an axle operatively associated with said second running wheel and movably connected to said frame, a draw arm for receiving a force enabling a forward movement of the device, said draw arm being rotatably connected to said frame, resilient means operatively associated with said draw arm and frame to urge the draw arm yieldingly into a predetermined position, and a movement transmitting device coupling the draw arm with the second running wheel for maintaining a predetermined relation between the position of the draw arm and the position of the second running wheel.

2. A device as claimed in claim 1 including a tube, a bar in said tube, said tube and bar being respectively coupled to said frame and draw arm and operatively associated with each other, and a spring between said tube and bar and urging the same apart.

3. A device as claimed in claim 1 wherein the movement transmitting device is a Bowden cable.

4. A device as claimed in claim 1 comprising means on the frame adjustably coupling said resilient means to said frame.

5. A device as claimed in claim 1 comprising means on the frame and operatively associated with said first running wheel to control the position of the latter relative to said frame.

References Cited in the file of this patent

UNITED STATES PATENTS

| | | |
|---|---|---|
| 1,253,089 | Owens | Jan. 8, 1918 |
| 1,492,491 | Swope | Apr. 29, 1924 |
| 1,752,638 | Johnson | Apr. 1, 1930 |
| 1,913,034 | Lindgren et al. | June 6, 1933 |
| 2,447,354 | Morrill | Aug. 17, 1948 |
| 2,485,853 | Willet | Oct. 25, 1949 |
| 2,757,504 | Elfes et al. | Aug. 7, 1956 |
| 2,801,509 | Salzmann | Aug. 6, 1957 |

FOREIGN PATENTS

| | | |
|---|---|---|
| 680,537 | Great Britain | Oct. 8, 1952 |